(12) United States Patent
Kim et al.

(10) Patent No.: US 10,778,284 B2
(45) Date of Patent: *Sep. 15, 2020

(54) METHOD AND APPARATUS FOR CONTROLLING INTERFERENCE IN COMMUNICATION SYSTEM USING MULTIPLE ANTENNAS

(71) Applicants: Samsung Electronics Co., Ltd, Gyeonggi-do (KR); Korea Advanced Institute of Science & Technology, Daejeon (KR)

(72) Inventors: Kwang-Taik Kim, Gyeonggi-do (KR); Wan Choi, Daejeon (KR); Myung-Gil Kang, Daejeon (KR); Hyo-Woon Seo, Daejeon (KR); Kyung-Rak Son, Daejeon (KR)

(73) Assignees: Samsung Electronics Co., Ltd., Suwon-si (KR); Korea Advanced Institute of Science & Technology, Daejeon (KR)

( * ) Notice: Subject to any disclaimer, the term of this patent is extended or adjusted under 35 U.S.C. 154(b) by 100 days.

This patent is subject to a terminal disclaimer.

(21) Appl. No.: 15/235,066

(22) Filed: Aug. 11, 2016

(65) Prior Publication Data

US 2017/0047966 A1    Feb. 16, 2017

(30) Foreign Application Priority Data

Aug. 11, 2015   (KR) ........................ 10-2015-0113416

(51) Int. Cl.
    *H04B 3/20*       (2006.01)
    *H04B 7/0452*     (2017.01)
    (Continued)

(52) U.S. Cl.
    CPC .............. *H04B 3/20* (2013.01); *H04B 7/022* (2013.01); *H04B 7/0452* (2013.01);
    (Continued)

(58) Field of Classification Search
    CPC ........ H04B 3/20; H04B 7/022; H04B 7/0452; H04B 7/0617; H04W 4/70; H04W 88/10
    See application file for complete search history.

(56) References Cited

U.S. PATENT DOCUMENTS

2007/0270113 A1 * 11/2007 Oh ..................... H04W 72/082
                                                        455/185.1
2009/0207765 A1 *  8/2009 Yamaura ............. H04B 7/0417
                                                         370/310

(Continued)

*Primary Examiner* — Gregory B Sefcheck
*Assistant Examiner* — Joshua Smith

(57) ABSTRACT

A method includes generating preference information according to each of a plurality of base stations including at least one adjacent base station and transmitting the generated preference information to a serving base station, receiving, from the serving base station, information related to beams of the serving base station and the at least one adjacent base station determined based on the preference information, and receiving a signal by using the information related to the beams, wherein the information related to the beams includes beam information on a partial area in which interference signals transmitted by the at least one adjacent base station are aligned among a whole reception area of the terminal. A serving base station includes a controller configured to configure beams for a partial area in which interference signals transmitted by the at least one adjacent base station are aligned among a whole reception area of the terminal.

12 Claims, 12 Drawing Sheets

(51) Int. Cl.
*H04B 7/06* (2006.01)
*H04W 4/70* (2018.01)
*H04B 7/022* (2017.01)
*H04W 88/10* (2009.01)

(52) U.S. Cl.
CPC ............ *H04B 7/0617* (2013.01); *H04W 4/70* (2018.02); *H04W 88/10* (2013.01)

(56) References Cited

U.S. PATENT DOCUMENTS

| | | | | |
|---|---|---|---|---|
| 2010/0278063 | A1* | 11/2010 | Kim | H04L 5/0073 370/252 |
| 2011/0177834 | A1* | 7/2011 | Shin | H04J 11/0033 455/501 |
| 2012/0077511 | A1* | 3/2012 | Shin | H04B 7/022 455/452.1 |
| 2012/0257568 | A1* | 10/2012 | Cai | H04W 72/0413 370/328 |
| 2013/0053079 | A1* | 2/2013 | Kwun | H04J 11/0053 455/509 |
| 2013/0064320 | A1* | 3/2013 | Nissani (Nissensohn) | H04L 1/0618 375/295 |
| 2013/0156139 | A1 | 6/2013 | Lee et al. | |
| 2014/0198681 | A1* | 7/2014 | Jung | H04B 7/0617 370/252 |
| 2014/0200010 | A1* | 7/2014 | Jose | H04B 7/0413 455/450 |
| 2014/0293911 | A1* | 10/2014 | Cheong | H04L 27/2656 370/329 |
| 2014/0328242 | A1* | 11/2014 | Tong | H04W 48/00 370/312 |
| 2015/0280878 | A1* | 10/2015 | Lee | H04L 5/0048 370/252 |
| 2017/0272133 | A1* | 9/2017 | Chen | H04L 25/03 |

* cited by examiner

Ex: ↑↑ - (w, w), (w, m), (m, w), (m, m), (m, s), (s, m)

↑↓ - (s, w)

↓↑ - (w, s)

↓↓ - (s, s)

METHOD AND APPARATUS FOR CONTROLLING INTERFERENCE IN COMMUNICATION SYSTEM USING MULTIPLE ANTENNAS

CROSS-REFERENCE TO RELATED APPLICATION(S) AND CLAIM OF PRIORITY

The present application is related to and claims priority under 35 U.S.C. § 119(a) to Korean Application Serial No. 10-2015-0113416, which was filed in the Korean Intellectual Property Office on Aug. 11, 2015, the entire content of which is hereby incorporated by reference.

TECHNICAL FIELD

The present disclosure relates to a method and an apparatus for controlling interference received by a receiving side in a communication system using multiple antennas.

BACKGROUND

In order to meet wireless data traffic demands that have increased after 4th generation (4G) communication system commercialization, efforts to develop an improved 5G communication system or a pre-5G communication system have been made. For this reason, the 5G communication system or the pre-5G communication system is called a beyond 4G network communication system or a post long term evolution (LTE) system.

In order to achieve a high data transmission rate, an implementation of the 5G communication system in a mm wave band (for example, 60 GHz band) is being considered. In the 5G communication system, technologies such as beamforming, massive MIMO, full dimensional MIMO (FD-MIMO), an array antenna, analog beam-forming, and a large scale antenna are discussed to mitigate a propagation path loss in the mmWave band and increase a propagation transmission distance.

Further, technologies such as an evolved small cell, an advanced small cell, a cloud radio access network (cloud RAN), an ultra-dense network, device to device communication (D2D), a wireless backhaul, a moving network, cooperative communication, coordinated multi-points (CoMP), and interference cancellation have been developed to improve the system network in the 5G communication system.

In addition, the 5G system has developed advanced coding modulation (ACM) schemes such as hybrid FSK and QAM modulation (FQAM) and sliding window superposition coding (SWSC), and advanced access technologies such as filter bank multi carrier (FBMC), non orthogonal multiple access (NOMA), and sparse code multiple access (SCMA).

Interference control schemes implemented and considered in the communication system control interference between base stations and user terminals mainly included in an interference channel environment. In reconstructing a signal, the interference control schemes have difficulty in actual implementation by using a high complex reconstruction scheme such as joint-decoding. Further, when a technology such as interference alignment is used, the complexity is low but a dimension in which the interference is aligned is ignored. Accordingly, a characteristic of an interference channel cannot be used and thus efficient transmission suitable for the interference environment cannot be made.

In order to compensate for a problem of the conventional interference control schemes that inefficiently use time/frequency resources, a scheme for controlling interference based on a characteristic of a channel of each base station is highly required and very important. Particularly, a need for the interference control scheme for effectively removing an influence of the interference and maximizing a capability of the user terminal has become higher in a state where various structural and hierarchical communication architectures are researched as standard models of a next generation mobile communication environment.

Therefore, the interference control scheme for more efficiently controlling interference in consideration of an environment where base stations having various structures and various functions coexist is needed.

SUMMARY

To address the above-discussed deficiencies, it is a primary object to provide a method and an apparatus for controlling interference of a receiving side in a communication system using multiple antennas.

In accordance with an aspect of the present disclosure, a reception method of a terminal in a communication system using multiple antennas is provided. The reception method includes: generating preference information according to each base station including at least one adjacent base station and transmitting the generated preference information to a serving base station; receiving, from the serving base station, information related to beams of the serving base station and the at least one adjacent base station determined based on the preference information; and receiving a signal by using the information related to the beams, wherein the information related to the beams includes beam information of a partial area in which interference signals transmitted by the at least one adjacent base station are aligned among reception areas of the terminal.

In accordance with another aspect of the present disclosure, a method of controlling interference of terminal by a serving base station in a communication system using multiple antennas is provided. The method includes: receiving preference information according to each base station including at least one adjacent base station; configuring beams for a partial area in which interference signals transmitted by the at least one adjacent base station are aligned among reception areas of the terminal based on the preference information; and transmitting information related to the configured beams to the terminal.

In accordance with another aspect of the present disclosure, a terminal in a communication system using multiple antennas is provided. The terminal includes: a controller that generates preference information according to each base station including at least one adjacent base station; a transmitter that transmits the preference information according to each base station to a serving base station; and a receiver that receives, from the serving base station, information related to beams for the serving base station and the at least one adjacent base station determined based on the preference information and receives a signal by using the information related to the beams, wherein the information related to the beams includes beam information of a partial area in which interference signals transmitted by the at least one adjacent base station are aligned among reception areas of the terminal.

In accordance with another aspect of the present disclosure, a serving base station for controlling interference of a terminal in a communication system using multiple antennas is provided. The serving base station includes: a receiver that receives preference information according to each base station including at least one adjacent base station; a controller that configures beams for a partial area in which interference signals transmitted by the at least one adjacent base station are aligned among reception areas of the terminal based on the preference information; and a transmitter that transmits information related to the configured beams to the terminal.

The present disclosure corresponds to a technology for controlling interference of signals received by a receiving side in a communication system using multiple antennas and proposes a method and an apparatus for more accurately reconstructing a signal and more flexibly operating reception areas of a terminal by performing a beam design and a power control to receive interference signals and data received by the corresponding terminal through divided areas. Further, according to the present disclosure, complexity of the data reconstruction becomes lower by applying different reconstruction schemes according to sizes of interference when the reconstruction is performed.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

The above and other aspects, features, and advantages of the present disclosure will be more apparent from the following detailed description taken in conjunction with the accompanying drawings, in which.

DETAILED DESCRIPTION

Figure 1:
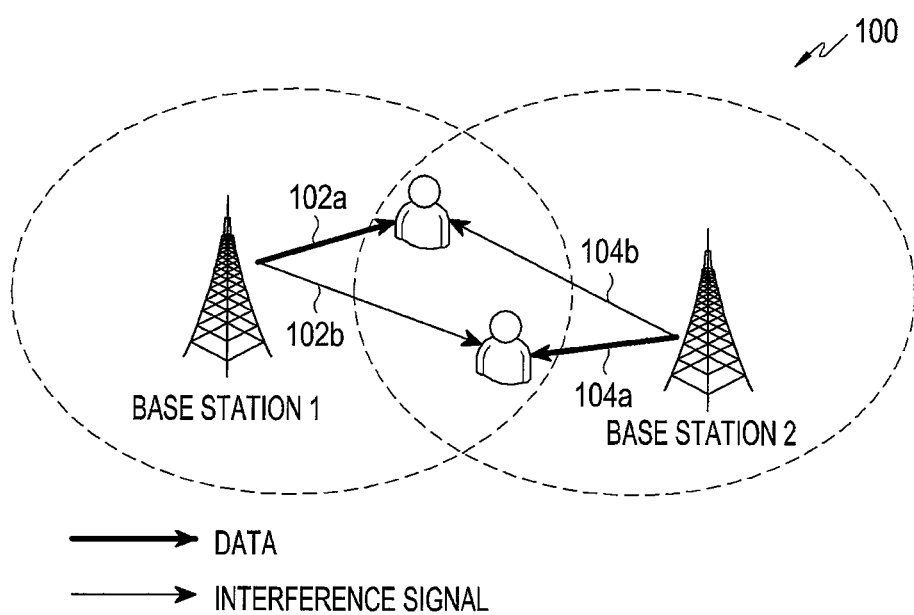
FIG. 1 illustrates an example of a structure of a wireless communication system to which an embodiment of the present disclosure can be applied.

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged telecommunication technologies.

Hereinafter, operation principles of exemplary embodiments of the present disclosure will be described in detail with reference to accompanying drawings. Like reference numerals designate like components in the drawings where possible even though components are shown in different drawings. In the following description of the present disclosure, a detailed description of related known functions or configurations will be omitted so as not to obscure the subject of the present disclosure. The terms as described below are defined in consideration of the functions in the embodiments, and the meaning of the terms may vary according to the intention of a user or operator, convention, or the like. Therefore, the definitions of the terms should be made based on the contents throughout the specification.

FIG. 1 illustrates an example of a structure of a wireless communication system to which an embodiment of the present disclosure can be applied.

Referring to FIG. 1, for example, it is assumed that base stations 1 and 2 which use a plurality of antennas exist and two terminals, that is, terminal 1 and terminal 2 which are located in an area where a service coverage of base station 1 and a service coverage of base station 2 overlap exist in a wireless communication system 100. At this time, cooperation between base station 1 and base station 2 is impossible. In this case, terminal 1 can receive an interference signal 104b received from base station 2 in addition to data 102a received from base station 1. Similarly, terminal 2 can also receive an interference signal 102b received from base station 1 in addition to data 104a received from base station 2.

As described above, in multi antenna-based communication, signals other than desired signals can be received as interference signals. Accordingly, embodiments of the present disclosure propose a method of efficiently controlling interference in a communication system that uses multiple antennas. Specifically, embodiments of the present disclosure propose a method of polarizing an area for receiving a signal by a receiving side into an area for receiving relatively strong interference and an area for receiving relatively weak interference based on a predetermined reference, designing beams of a transmitting side and the receiving side to receive corresponding signals in the polarized areas, and controlling transmission power in the designed beams.

Hereinafter, in embodiments of the present disclosure, one or more transmission devices having a plurality of antennas communicate with a reception device and, at this time, it is assumed that cooperation between the transmission devices is impossible.

First, in an embodiment of the present disclosure, it is assumed that one terminal can receive an interference signal through an adjacent base station as well as a serving base station. In this case, the terminal according to an embodiment of the present disclosure feeds interference channel information back as well as channel information with the serving base station to the serving base station.

Figure 2A:
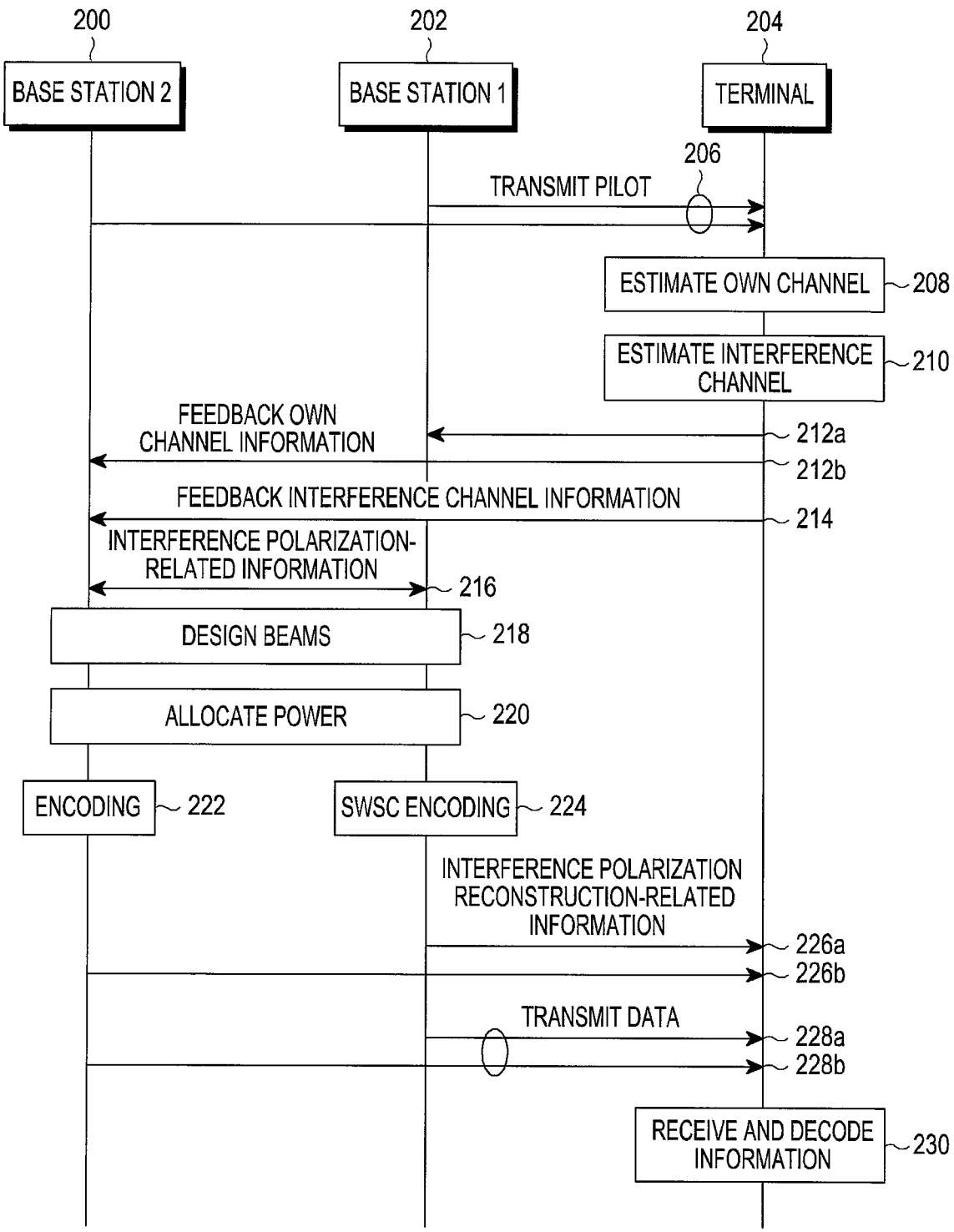
FIG. 2A illustrates an example of a flowchart of a total operation for controlling interference of a terminal according to an embodiment of the present disclosure.

FIG. 2A illustrates an example of a flowchart of a total operation for controlling interference of a terminal according to an embodiment of the present disclosure.

For convenience of the description, although an environment where one terminal receives an interference signal from one adjacent base station as well as the serving base station is described as an example in the embodiment of FIG. 2A, the present disclosure can be expanded to an environment where one terminal receives interference signals from two or more base stations or a plurality of terminals receive interference signals from one or more base stations. Further, the base station described in an embodiment of the present disclosure use multiple antennas, and the use of the multiple antennas can be made in the form of a plurality of digital beams. Here, base station #2 200 corresponds to a serving base station of a terminal 204, and acquires information (hereinafter, referred to as "interference channel information") on an interference channel of the terminal 204, that is, a channel between base station #1 202 and the terminal 204 in an embodiment of the present disclosure.

Referring to FIG. 2A, in step 206, each of base station #2 200 and base station #1 202 transmits a pilot signal. Then, in step 208, the terminal 204 estimates a channel with base station #2 200 by using the pilot signal received from base station #2 200. Further, in step 210, the terminal 204 can estimate an interference channel with base station #1 202 by using the pilot signal received from base station #1 202. In addition, in step 212a, the terminal 204 feeds the estimated interference channel information back to base station #1 202. In step 212b and step 214, the terminal 204 feeds the channel information and the interference channel information estimated for base station #2 200 back to base station #2 200.

In step 216, base station #2 200 exchanges interference polarization-related information of a reception area of the terminal 204. Here, the interference polarization-related information includes information on beams between base station #2 200, base station #1 202, and the terminal 204, transmission power information, and information on an encoding for the interference polarization.

Then, in step 218, each of base station #2 200 and base station #1 202 performs beamforming for the interference polarization based on beam information acquired from the interference polarization-related information. In a concrete example, base station #2 200 and base station #1 202 can form a beam corresponding to an antenna having a strong interference channel characteristic and a beam corresponding to an antenna having a weak interference channel characteristic, respectively.

In step 220, each of base station #2 200 and base station #1 202 controls power of its own beam formed based on the transmission power information acquired in step 216. Specifically, base station #2 200 sets transmission power of data, which is to be transmitted through the beam having the strong interference channel characteristic, to be lower than a predetermined reference. Further, base station #2 200 sets transmission power of data, which is to be transmitted through the beam having the weak interference channel characteristic, to be higher than the predetermined reference.

In steps 222 and 224, each of base station #2 200 and base station #1 202 performs an encoding of a signal to be transmitted through the formed beams according to an embodiment of the present disclosure. At this time, base station #2 200 and base station #1 202 perform an encoding of the signal transmitted through the beam having the strong interference channel by using a sliding window superposition coding (SWSC) and perform a general encoding of the signal transmitted through the beam having the weak interference channel among beams formed therein, respectively.

In step 226a to step 226b, each of base station #2 200 and base station #1 202 transmits beam design information and reconstruction information for the determined interference polarization to the terminal 204. For example, with respect to the beam having the strong interference channel, base station #1 202 can transmit information indicating performance of a decoding using the SWSC to the terminal 204.

Thereafter, in steps 228a to 228b, each of base station #2 200 and base station #1 202 transmits, to the terminal 204, data to which beam design and power control for the determined interference polarization are applied. Then, in step 230, the terminal 204 receives and reconstructs data and signals. Steps 216 to 226b of the embodiment of FIG. 2A performed according to an embodiment of the present disclosure will be described in more detail through the following description.

Figure 2B:
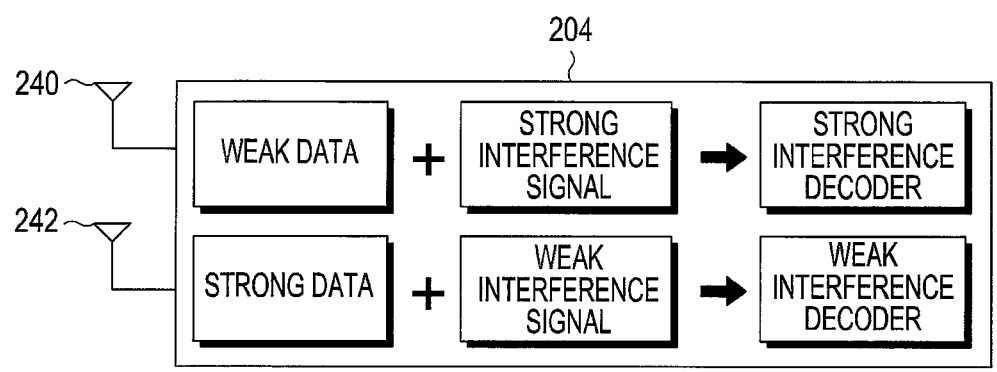
FIG. 2B illustrates an example of a terminal that receives a signal to which interference polarization is applied according to an embodiment of the present disclosure.

FIG. 2B illustrates an example of a terminal that receives a signal to which interference polarization is applied according to an embodiment of the present disclosure.

Referring to FIG. 2B, the terminal 204 can receive a signal through each of antenna #1 240 corresponding to the beam to which the strong interference channel characteristic is applied and antenna #2 242 corresponding to the beam to which the weak interference channel characteristic is applied. In this case, the terminal 204 performs a reconstruction operation corresponding to the characteristic of the corresponding signal. Specifically, the terminal 204 receives data having a relatively low signal strength and an interference signal having a relatively high signal strength through antenna #1 240, and decodes the strong interference signal. Further, the terminal 204 receives data having relatively high signal strength and an interference signal having a relatively low signal strength through antenna #2 242, and decodes the weak interference signal. A terminal operation according to an embodiment of the present disclosure will be also described below in more detail.

Figure 3A:
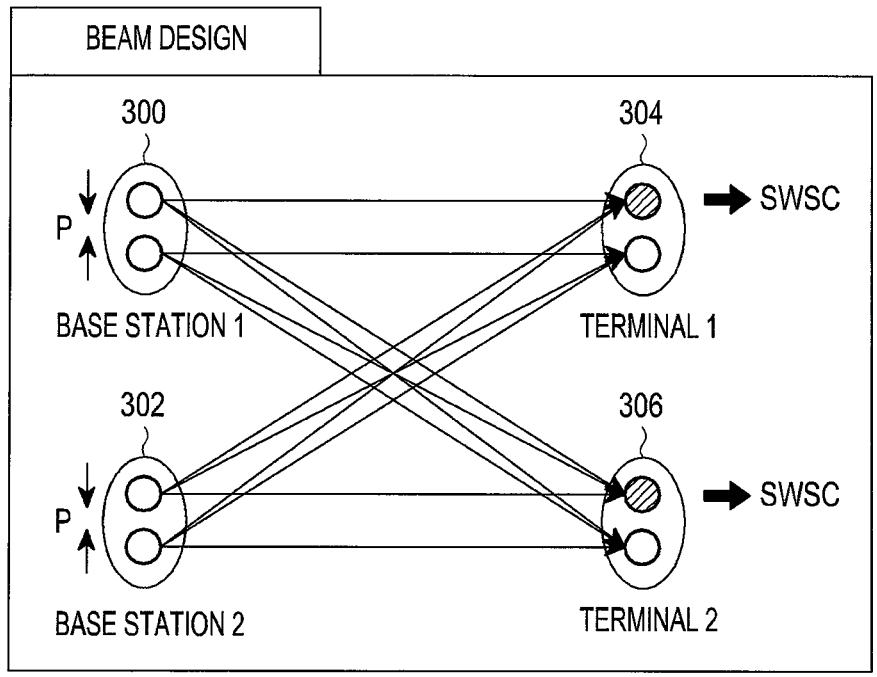
FIG. 3A illustrates an example of performing an antenna parallelization through digital beamforming and then polarizing an interference characteristic of a receiving side according to an embodiment of the present disclosure.

FIG. 3A illustrates an example of performing an antenna parallelization through digital beamforming and then polarizing an interference characteristic of a receiving side according to an embodiment of the present disclosure.

Referring to FIG. 3A, for example, it is assumed that terminal #1 304 and terminal #2 306 are located at positions where signals transmitted in service coverages of two base stations, that is, base station #1 300 and base station #2 302 can be received. According to an embodiment of the present disclosure, base station #1 300 and base station #2 302, and terminal #1 304 and terminal #2 306 parallelize antennas by using a beamforming scheme such as singular value decomposition (SVD) or zero-forcing (ZF). At this time, a dimension of a channel parallelized between the base station and the terminal can be divided in the form in which one reception antenna is connected to one transmission antenna as illustrated in FIG. 3A.

Here, it is assumed that each base station and terminal has a channel structure parallelized in two antenna dimensions. Further, the base station controls transmission power for each of antenna dimensions divided for interference polarization. Specifically, the base station reduces transmission power to be lower than a predetermined threshold value to make an interference signal stronger compared to a signal of data to be transmitted by the base station in one antenna dimension. Further, the base station increases transmission power to make the interference signal weaker compared to the data in the other antenna dimension. Thereafter, according to an embodiment of the present disclosure, the base station can encode/decode a reception signal in the antenna dimension of the strong interference signal by using a sliding window superposition coding (SWSC) and decode a reception signal in the antenna dimension of the weak interference signal while considering the interference included in the reception signal as noise and thus ignoring the interference.

For example, it is assumed that base station #1 300 is a serving base station of terminal #1 304 and base station #2 302 is a serving base station of terminal #2 306. Then, terminal #2 306 receives signals transmitted from base station #1 300 as interference signals. Similarly, terminal #1 304 also receives signals transmitted from base station #2 302 as interference signals.

Figure 3B:
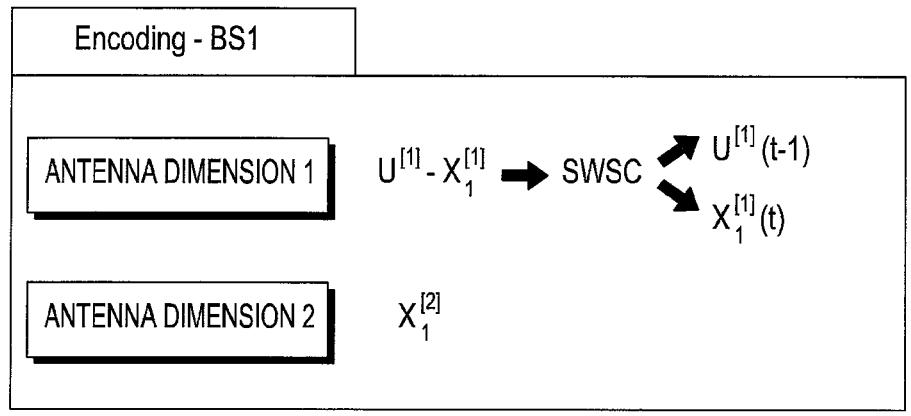
FIG. 3B illustrates an encoding method and transmission of base station 1 of FIG. 3A.

For example, it is assumed that base station #1 300 recognizes channel information of base station #1 300 and interference channel information of base station #2 302, and base station #2 302 recognizes only channel information of base station #2 302. Further, when it is assumed that interference of antenna dimension 1 of each of terminal #1 304 and terminal #2 306 is designed to become stronger, signals received through antenna dimension 1 are decoded using the SWSC. FIG. 3B illustrates an encoding method and transmission of base station #1 of FIG. 3A.

Referring to FIG. 3B, base station 1 encodes signals, which are received through antenna dimension 1 designed to make interference stronger, by using the SWSC. Specifically, base station 1 encodes $U^{[1]}$ corresponding to a cloud center of a superposition coding according to a basic operation of the SWSC and encodes a message, which is to be transmitted by base station 1 at a current time point t based on the encoded message, into $X_1^{[1]}$. At this time, unlike the existing superposition coding, $X_1^{[1]}(t)$ encoded based on a message $U^{[1]}(t-1)$ of a previous time (frequency) is transmitted through antenna dimension 1. Further, base station 1 transmits $X_1^{[2]}(t)$ generated by encoding, through an encoder using a turbo code or a low-density parity check codes (LDPC), a current message to be transmitted through antenna dimension 2 designed to make interference weaker.

Figure 3C:
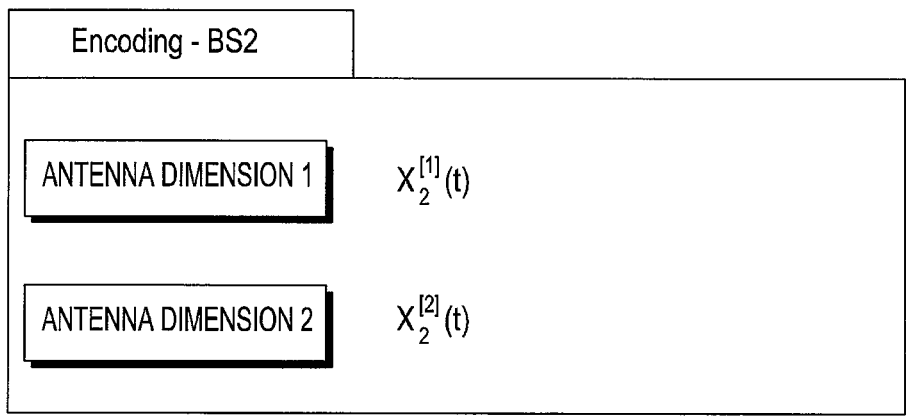
FIG. 3C illustrates an encoding method and transmission of base station 2 of FIG. 3A.

FIG. 3C illustrates an encoding method and transmission of base station 2 of FIG. 3A.

Referring to FIG. 3C, since base station 2 does not perform the SWSC, base station 2 encodes a current message to be transmitted through antenna dimension 1 into $X_2[1](t)$ through an encoder and transmits $X_2[1](t)$, and encodes a current message to be transmitted through antenna dimension 2 into $X_2[2](t)$ through the encoder and transmits $X_2[2](t)$.

Figure 4A:
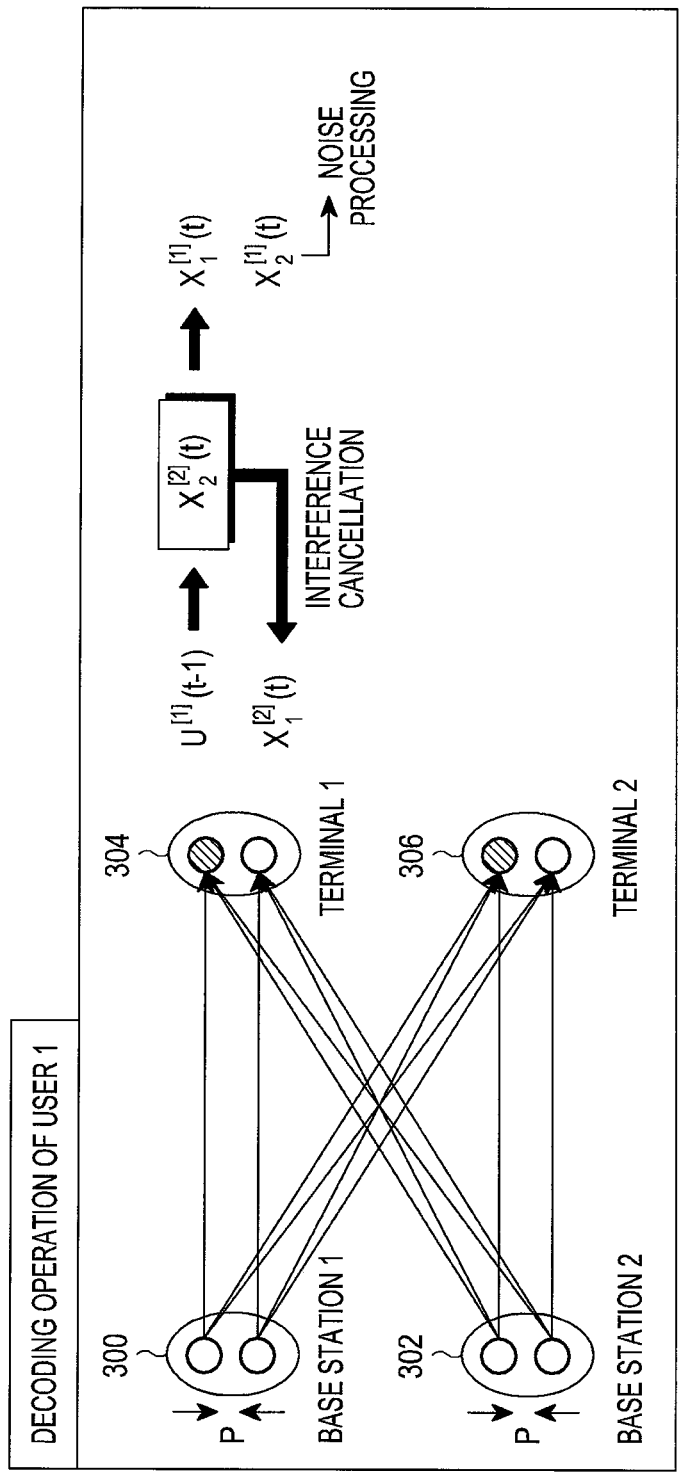
FIG. 4A illustrates reception and a reconstruction method of terminal 1 of FIG. 3A.

FIG. 4A illustrates reception and a reconstruction method of terminal 1 of FIG. 3A.

Referring to FIG. 4A, antenna dimension 1 of terminal #1 304 has the strong interference characteristic, and thus receives a message encoded using the SWSC. According to an embodiment of the present disclosure, antenna dimension 1 of terminal #1 304 first reconstructs a signal received through the antenna dimension having the strong interference channel characteristic. Accordingly, terminal #1 304 first reconstructs a message $U^{[1]}(t-1)$ of a previous time (frequency) among signal blocks received through antenna dimension 1 and reconstructs a current interference signal $X_2^{[2]}(t)$ transmitted by base station 2 through antenna dimension 2. Subsequently, terminal #1 304 reconstructs the current message $X_1^{[1]}(t)$ of antenna dimension 1.

Next, with respect to the current message received in antenna dimension 2 of terminal #1 304 having the weak interference channel characteristic, terminal #1 304 removes interference received through antenna dimension 2 by using the current interference signal $X_2^{[2]}(t)$ reconstructed through antenna dimension 1 of terminal #1 304 and noise-processes $X_2^{[1]}(t)$ reconstructed through antenna dimension 1, so as to reconstruct the current message $X_1^{[2]}(t)$ received through antenna dimension 2.

Figure 4B:
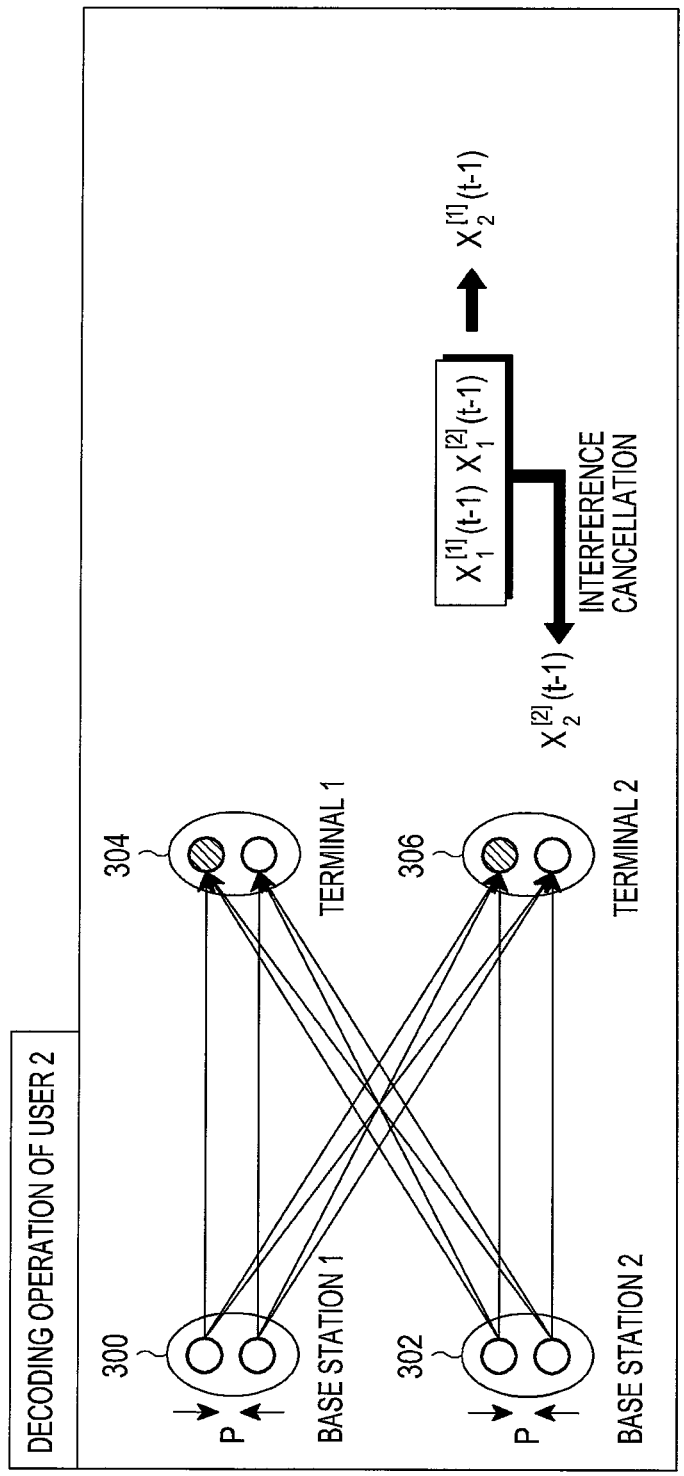
FIG. 4B illustrates reception and a reconstruction method of terminal 2 of FIG. 3A.

FIG. 4B illustrates reception and a reconstruction method of terminal 2 of FIG. 3A.

Referring to FIG. 4B, terminal #2 306 also first reconstructs a reception signal of antenna dimension 1 having the strong interference channel characteristic. First, terminal #2 306 reconstructs interference signals $X_1^{[1]}(t-1)$ and $X_1^{[2]}(t-1)$ of a previous time (frequency) transmitted from antenna dimensions 1 and 2 of base station 1. Further, terminal 2 reconstructs the message $X_2^{[1]}(t-1)$ of antenna dimension 1 of a previous time (frequency).

Next, terminal 2 reconstructs a reception signal of antenna dimension 2 of terminal #2 306 having the weak interference channel characteristic. First, terminal #2 306 removes interference received through antenna dimension 2 of terminal #2 306 by using the interference signals $X_1^{[1]}(t-1)$ and $X_1^{[2]}(t-1)$ of the previous time (frequency) reconstructed in antenna dimension 1 of terminal #2 306. Further, terminal #2 306 reconstructs the message $X_2^{[2]}(t-1)$ of antenna dimension 2 of the previous time (frequency) from the signals of antenna dimension 2 from which the interference has been removed.

Hereinafter, according to another embodiment of the present disclosure, dimensions are divided into a dimension (hereinafter, referred to as an "interference alignment dimension") in which interference signals which can be received in a reception area of the receiving side are aligned and the remaining dimensions except for the interference alignment dimension in the reception area. Further, in the remaining dimensions, interference signals having a signal strength opposite to a signal strength of a signal transmitted in the interference alignment dimension can be received from adjacent base stations of the receiving side. For example, the remaining dimension can include an area in which a relatively strong interference signal is received and an area in which a relatively weak interference signal is received. Another embodiment of the present disclosure proposes a method of designing beams corresponding to antenna dimensions of the transmitting/receiving side to be mapped to the divided dimensions and controlling transmission power in the designed beams.

Figure 5A:
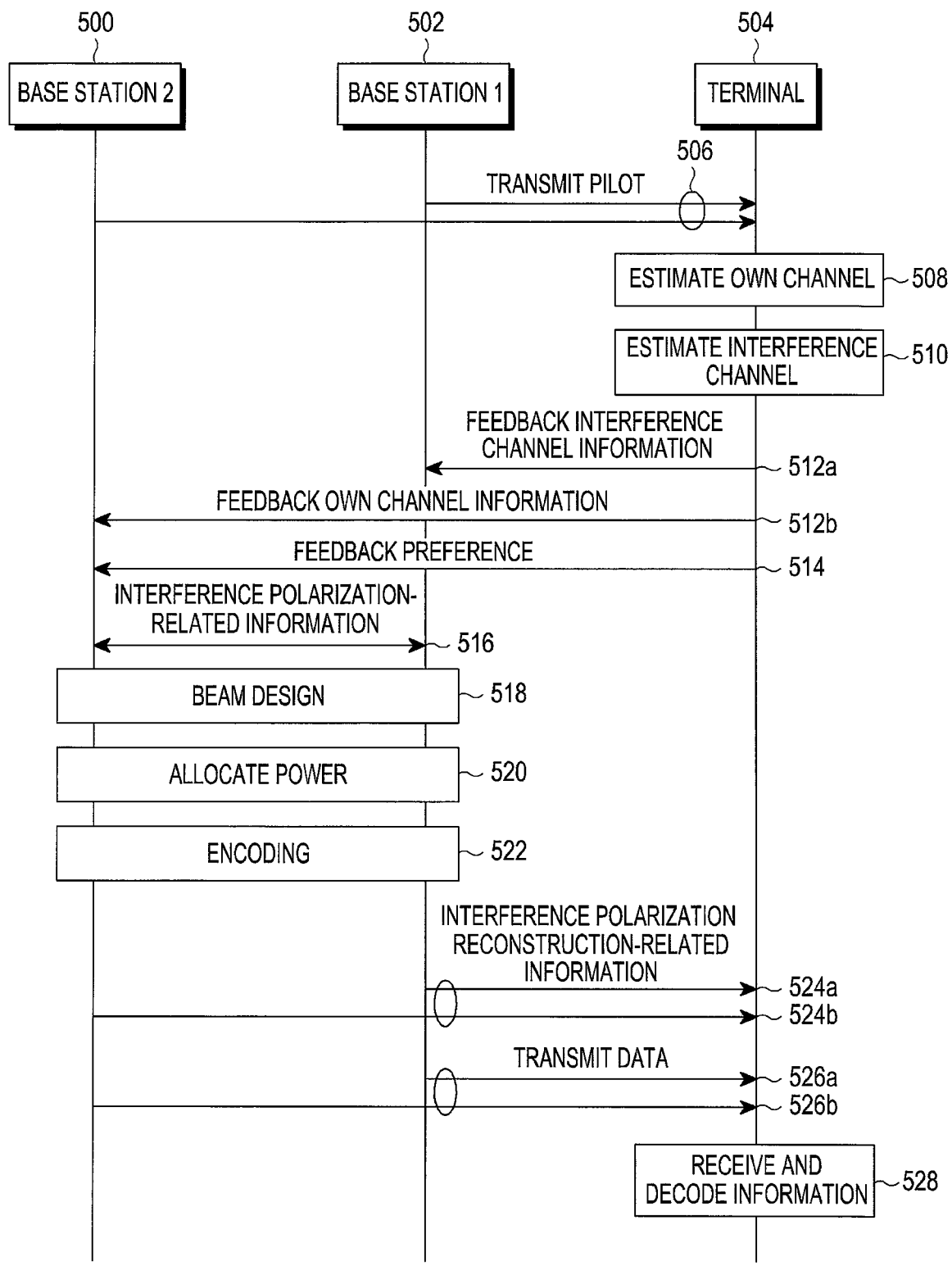
FIG. 5A illustrates an example of a flowchart of a total operation for controlling interference of a terminal according to another embodiment of the present disclosure.

FIG. 5A illustrates an example of a flowchart of a total operation for controlling interference of the terminal according to another embodiment of the present disclosure. For convenience of the description, it is assumed that a terminal 504 receives an interference signal from base station #1 502 corresponding to one adjacent base station in addition to base station #2 500 corresponding to a serving base station in the embodiment of FIG. 5A. For convenience of the description, although the terminal 504 receives an influence from one adjacent base station in the embodiment of FIG. 5A, an embodiment of the present disclosure can be applied to a communication environment where two or more adjacent base stations exist or a plurality of terminals receive an interference influence from two or more adjacent base stations. Further, it is assumed that both base station #1 502 and base station #2 500 corresponding to the adjacent base station and the serving base station include a plurality of antennas.

Referring to FIG. 5A, in step 506, each of base station #2 500 and base station #1 502 transmits a pilot signal. In step 508, the terminal 504 estimates an interference channel with base station #1 502 and estimates a channel with base station #2 500. The terminal 504 feeds the estimated interference channel information back to base station #1 502 in step 512a, and feeds channel information of base station #2 500 and the interference channel information back to base station #2 500 in step 512b. According some embodiments, the terminal 504 can feed only the channel information estimated for each base station back and can the adjacent base stations can feed their own channel information back to the serving base station. That is, base station #1 502 can transfer interference channel information received from the terminal 504 to base station #2 500.

Further, in step 514, the terminal 504 transmits preference information generated according to an embodiment of the present disclosure to base station #2 500. According to some embodiments, the terminal 504 transmits base station-specific preference information of the corresponding base station and can also transfer preference information of adjacent base stations to the serving base station. The preference information will be described in detail through the following description with reference to FIG. 5B. Although the number of terminals is one in the embodiment of FIG. 5A for convenience of the description, a plurality of terminals can exist in a service coverage of each base station and, in this case, the corresponding base station can receive preference information of each of the corresponding terminals. In step 516, base station #2 500 can determine beam design and power control to polarize a reception area of the terminal 504 into an interference alignment dimension and a dimension in which relatively strong or weak interference is received based on the channel information and preference information fed back from the terminal 504. Further, a result of the determined beam design and power control is transferred base station #1 502.

Then, in step 518, each of base station #1 500 and base station #2 502 parallelize antennas that form channels corresponding to the interference alignment dimension of the terminal 504 and the dimension in which the relatively strong or weak interference is received and perform a beam design operation for the parallelized channels based on the channel information feedback of the terminals and the result received by each of base station #1 500 and base station #2 502. In step 520, each of base station #1 500 and base station #2 502 performs power control applied to the beam design made through the result. In this case, it is possible to decrease transmission power of antenna dimensions corresponding to a dimension in which high interference is received and to increase transmission power of an antenna dimension corresponding to a dimension in which low interference is received. At this time, a strength of the transmission power is based on the preference feedback received through the terminal and a determination on a power strength for the preference feedback will be described in more detail through the following description.

Thereafter, in step 522, each of base station #1 500 and base station #2 502 encodes the signal to which the beam design and power control previously determined for the terminal 504 are applied. In steps 524a and 524b, each of base station #1 500 and base station #2 502 transmits beam design information and reconstruction information determined as described above to the terminal 504. Antenna dimension-specific reconstruction information will be also described below in detail. In steps 526a and 526b, each of base station #1 500 and base station #2 502 transmits the signal to which the beam design and the power control are applied.

Figure 5B:
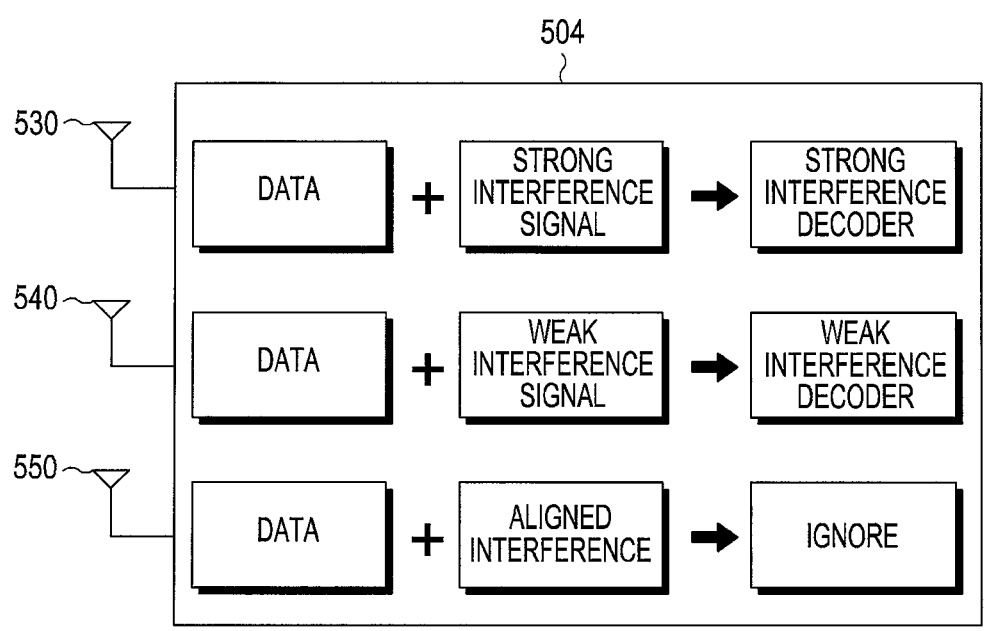
FIG. 5B illustrates an example of a case where a terminal receives pilot signals in step 506 of FIG. 5A.

Thereafter, in step 528, the terminal 504 decodes data and signals received from each of base station #1 500 and base station #2 502 based on the beam design information and the reconstruction information. FIG. 5B illustrates an example of a case where the terminal receives data in step 528 of FIG. 5A.

Referring to FIG. 5B, for example, the terminal 504 can receive a signal through each of a total of three antenna dimensions 530, 540, and 550 divided to correspond to beam design information received from the serving base station according to an embodiment of the present disclosure. The terminal 504 receives an interference signal having a relatively high signal strength along with data through antenna dimension #1 530 to which the strong interference channel characteristic is applied, receives data having a relatively low signal strength, and decodes the strong interference signal.

Further, the terminal 504 receives an interference signal having a relatively low signal strength through antenna dimension #2 540 to which the weak interference channel characteristic is applied but receives data having a relatively high signal strength, and decodes the data while ignoring the weak interference signal.

Lastly, when there is no difference between strengths of data and an interference signal received through antenna dimension #3 550 corresponding to the aligned interference dimension or when two or more interference signals are received, the terminal 504 considers the signals received through antenna dimension #3 550 as noise and ignores the signals.

Figure 6A:
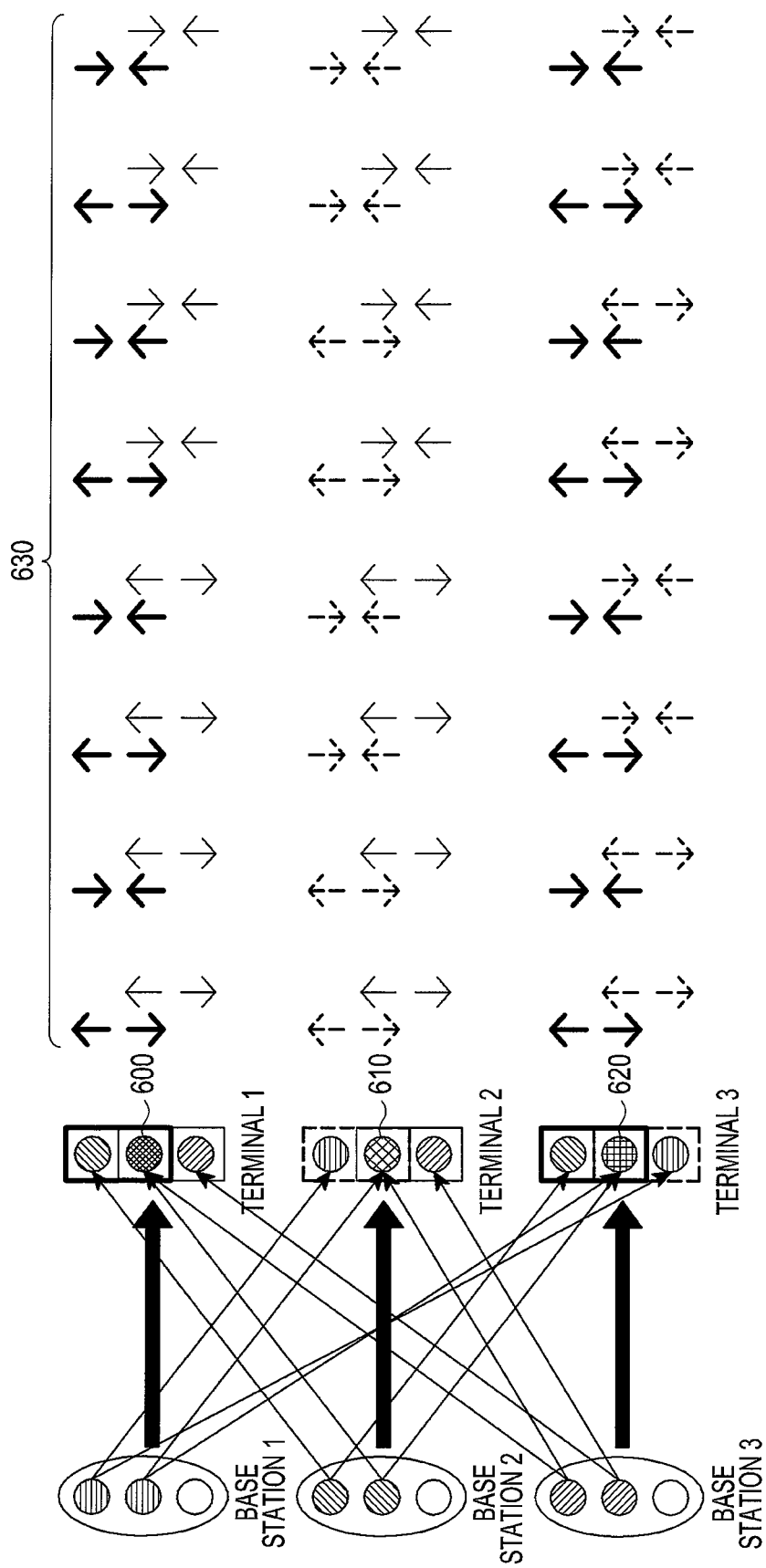
FIG. 6A illustrates an example of a detailed operation for configuring preference information by a terminal according to another embodiment of the present disclosure.

FIG. 6A illustrates an example of a detailed operation for configuring preference information by the terminal according to an embodiment of the present disclosure.

For convenience of the description, it is assumed that a terminal corresponding to each of three users receive an interference influence from two adjacent base stations in addition to its own serving base station.

Referring to FIG. 6A, it is assumed that terminal 1 is served through base station 1 and receives an interference influence from base stations 2 and 3. In this case, terminal 1 can also simultaneously receive data transmitted from base station 1 and interference signals transmitted from the remaining base stations 2 and 3. For example, terminal 1 receives an interference signal transmitted from each of base stations 2 and 3 through each of antenna dimensions 1 and 3 of terminal 1, but receives interference signals transmitted from both base stations 2 and 3 through antenna dimension #2 600 of terminal 1 in FIG. 6A. Terminal 2 also receives an interference signal transmitted from each of base stations 1 and 3 through each of antenna dimensions 1 and 3 of terminal 2, but receives interference signals transmitted from both base stations 1 and 3 through antenna dimension #2 610 of terminal 2. Terminal 3 receives an interference signal transmitted from each of base stations 1 and 2 through each of antenna dimensions 1 and 3 of terminal 3, but receives signals transmitted from both base stations 1 and 2 through antenna dimension #3 620 of terminal 3.

Then, each of terminals 1 to 3 divides interference signals received through its own antenna dimension according to a predetermined size. Specifically, each of terminals 1 to 3 can measure sizes of interference signals before beamforming by using received pilot signals. Each of terminals 1 to 3 divides (or determines) the sizes of the interference signals into "weak" and "medium" based on a position that matches a channel capacity which can be acquired using a time division multiplex (TDM) scheme, and divides (or determines) the sizes of the interference signals into "medium" and "strong" based on a position where the size of the interference signal becomes equal to a size of a data signal received through its own channel. For example, when dividing the sizes of the interference signals, each of terminals 1 to 3 can use $$\alpha = \frac{\log INR}{\log SNR}$$

corresponding to an index indicating a ratio between an interference signal and a data signal according to an embodiment of the present disclosure. For example, when the size of the interference signal received through the corresponding antenna dimension is included in a range of 0<α<0.5, each of terminals 1 to 3 can determine the size of the interference signal of the antenna dimension as "weak". Alternatively, the size of the interference can be determined as "medium" when the size of the interference signal of the antenna dimension is included in a range of 0.5<α<0.1, and the size of the interference can be determined as "strong" when the size of the interference signal of the antenna dimension is included in a range of α≥1.

Further, when the size of the interference signal for the corresponding antenna dimension is determined, each of terminals 1 to 3 can determine transmission power of the corresponding base station based on sizes of interference signals mapped according to each of antenna dimensions. According to an embodiment of the present disclosure, as illustrated in FIG. 6A, it is assumed that each terminal displays an up direction arrow instructing to transmit transmission power of the base station for the corresponding antenna dimension that is higher than or equal to a predetermined transmission power threshold value and a down direction arrow instructing to transmit transmission power that is lower than the transmission power threshold value. As a result, all the number of cases that can be expressed by the up direction arrow and the down direction arrow for each of the interference signals received by the corresponding terminal in each antenna dimension can be indicated by reference numeral 630.

When one up direction arrow is expressed or the up direction arrow and the down direction arrow are simultaneously expressed in the corresponding antenna dimension based on a reception result of the interference signal in the antenna dimension according to each terminal, the antenna dimension is classified as an area having a relatively high interference signal (hereinafter, referred to as a "high interference area"). In the high interference area, a method of decoding data through the conventional sliding window superposition coding (SWSC) or joint decoding should be applied.

When only one down direction arrow is expressed, a strength of the interference signal in the corresponding antenna dimension is very weak, so that the corresponding interference can be processed as noise. Lastly, when two up direction arrows are expressed, there is no distinction between data and the interference signal, so that the signal of the corresponding area can be ignored.

Figures 6B, 6C:
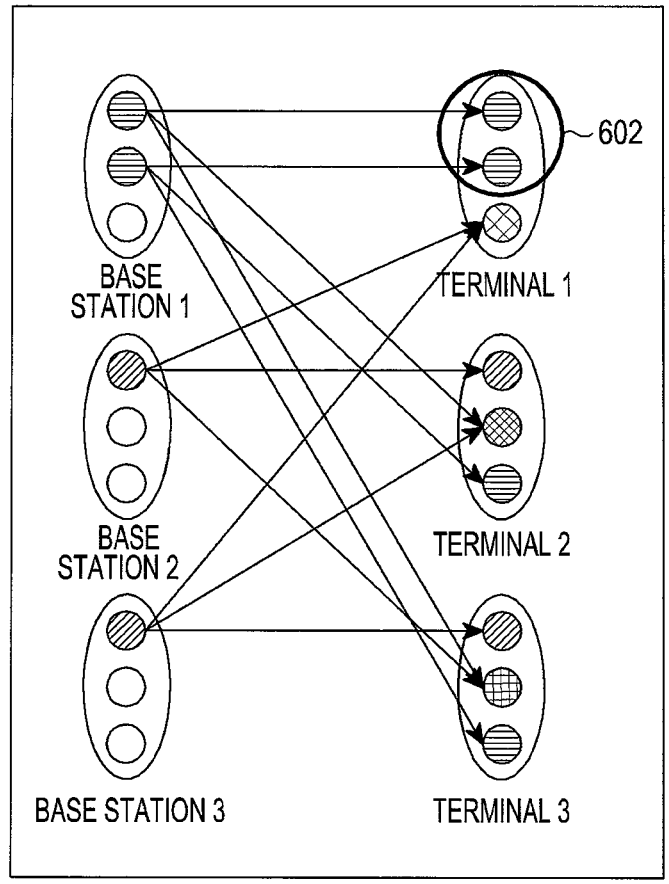
FIG. 6B illustrates a detailed example of preference information which can be configured by a terminal according to an embodiment of the present disclosure.
FIG. 6C illustrates a comparison between a conventional interference alignment technology and an embodiment of the present disclosure.

FIG. 6B illustrates a detailed example of preference information which the terminal can configure according to an embodiment of the present disclosure.

Referring to FIG. 6B, the terminal can measure sizes of interference signals before beamforming through received pilot signals, divide the sizes of the interference signals into "weak" and "medium" based on a position that matches a channel capacity which can be acquired using a time division multiplex (TDM) scheme, and divide the sizes of the interference signals into "medium" and "strong" based on a position where the size of the interference signal becomes equal to a size of a data signal received through its own channel. Specifically, the terminal can use $$\alpha = \frac{\log INR}{\log SNR}$$

as an index indicating a ratio between an interference signal and a data signal. For example, the terminal can determine the size of the interference signal as "weak" when the size is included in a range of 0<α<0.5. Further, the terminal can determine the size of the interference signal as "medium" when the size is included in a range of 0.5≤α<1, and determine the size of the interference signal as "strong" when the size is included in a range of α≥1.

In FIG. 6B, w denotes a case where the size of the interference is "weak", m denotes a case where the size of the interference is "medium", and s denotes a case where the size of the interference is "strong". When the size of the interference through the pilot signal received by the terminal indicates (w,w), (w,m), (m,w), (m,m), (m,s), and (s,m), preference of the terminal is mapped to two up direction arrows. Similarly, (s,w) is mapped to one up direction arrow and one down direction arrow, (w,s) is mapped to one down direction arrow and one up direction arrow, and (s,s) is mapped to two down direction arrows.

For example, interference polarization preference information according to an embodiment of the present disclosure can be represented by two bits, and "1" can indicate a value corresponding to the up direction arrow and "0" can indicate a value corresponding to the down direction arrow. The interference polarization preference information can be mapped to an indicator of each antenna dimension and then transmitted, or can include a bit indicating an antenna dimension in addition to the interference signal strength.

The base station having received the terminal-specific preference information configured as described above can determine a beam and a size of transmission power to receive an interference signal of an interference signal strength indicated by the corresponding preference information in the interference alignment dimension among antenna dimensions of the corresponding terminal according to another embodiment of the present disclosure. Further, the base station can design the beam and determine the size of transmission power to be applied to receive an interference signal of an opposite size of the interference signal strength indicated by the preference information in the remaining antenna dimensions.

FIG. 6C illustrates a general technology for aligning interference for a comparison with a technology proposed by an embodiment of the present disclosure.

Referring to FIG. 6C, base station 1 can perform beam design and power control to allow terminal 1 to receive only data transmitted by base station 1 through antenna dimensions 1 and 2 602 of terminal 1 and to receive interference signals transmitted by base stations 2 and 3 through antenna dimension 3 of terminal 1. Further, base station 2 can perform beam design and power control to allow terminal 2 to receive data transmitted by base station 2 only through antenna dimension 1 of terminal 2 and to receive interference signals transmitted by base stations 1 and 3 through the remaining antenna dimensions 2 and 3 of terminal 2. Lastly, base station 3 can control terminal 3 to receive data transmitted by base station 3 through antenna dimension 1 of terminal 3 and to receive interference signals transmitted by base stations 1 and 2 through antenna dimensions 2 and 3 of terminal 3.

Compared to the above, the technology proposed according to an embodiment of the present disclosure receives data through all antenna dimensions and controls only a characteristic of interference received in the corresponding antenna dimension. Referring to FIG. 6A, base station 1 uses a dimension 600 as a dimension for interference alignment and receives individual interference through another channel in each of the remaining dimensions. At this time, each dimension has one of the eight interference characteristics indicated by reference numeral 630 by polarization according to an embodiment of the present disclosure.

Table 1 illustrates equations of a beam design process for polarizing a reception-possible area of the receiving side into a dimension in which interference is aligned and a dimension having high/low interference according to an embodiment of the present disclosure.

TABLE 1

$\text{span}(A) \subseteq \text{span}(H_{21}V_1)$
$\text{span}(A) \subseteq \text{span}(H_{23}V_3)$ $\text{span}(B) \subseteq \text{span}(H_{31}V_1)$
$\text{span}(B) \subseteq \text{span}(H_{32}V_2)$ $\text{span}(H_{21}V_{12}) = \text{span}(H_{23}V_{31})$
$\text{span}(H_{31}V_{12}) = \text{span}(H_{32}V_{22})$
$\text{span}(H_{12}V_{22}) = \text{span}(H_{13}V_{31})$ $\text{span}(C) \subseteq \text{span}(H_{12}V_2)$
$\text{span}(C) \subseteq \text{span}(H_{13}V_3)$ Referring to Table 1, A, B, and C denote antenna dimensions for interference alignment of terminals 1, 2, and 3 in a communication system configured as FIG. 6A for convenience of the description.

First, a serving base station of terminal 2, that is, base station 2 designs a beam V1 of base station 1 and a beam V3 of a base station 3 to make a part of the transmission space from base station 1 to terminal 2 span sub area A which is the same space as a part of the transmission space from base station 3 to terminal 2. Accordingly, sub area A can include a dimension formed by a channel H21 from base station 1 to terminal 2 and a beam V12 of antenna dimension 2 of base station 1, and a dimension formed by a channel H23 from base station 3 to terminal 2 and a beam V31 of antenna dimension 1 of base station 3.

Next, a serving base station of user 3, that is, base station 3 designs abeam V1 of base station 1 and a beam V2 of a base station 2 to make a part of the transmission space from base station 1 to terminal 3 span sub area B which is the same space as a part of the transmission space from base station 2 to terminal 3. Accordingly, sub area B can include a dimension formed by a channel H31 from base station 1 to terminal 3 and a beam V12 of antenna dimension 2 of base station 1, and a dimension formed by a channel H32 from base station 2 to terminal 3 and a beam V22 of antenna dimension 2 of base station 2.

Lastly, a serving base station of terminal 1, that is, base station 1 designs a beam V2 of base station 1 and a beam V3 of a base station 3 to make a part of the transmission space from base station 2 to terminal 1 span sub area C which is the same space as a part of the transmission space from base station 3 to terminal 1. Accordingly, sub area C can include a dimension formed by a channel H12 from base station 2 to terminal 1 and a beam V22 of antenna dimension 2 of base station 2, and a dimension formed by a channel H31 from base station 3 to terminal 1 and a beam V31 of antenna dimension 1 of base station 3.

Further, data transmitted through the remaining dimensions of each base station is received in each of the remaining areas except for sub areas A, B, and C for interference alignment of each terminal, and each terminal performs a reconstruction operation through the above description method.

According to the above described embodiment of the present disclosure, it is possible to design the beams to align interference signals only in some of the reception areas of each terminal. Further, according to some embodiments, compared to the conventional interference alignment method, there is an effect of using a free beam space and making a flexible beam design through a ratio between the area in which interference signals are aligned and the remaining areas in the reception areas of each terminal.

The beams acquired through the beam design process of Table 1 can be represented as Table 2 below.

TABLE 2

| | |
|---|---|
| $V_{12} = H_{31}^{-1}H_{32}V_{22}$ | $\text{span}(V_{12}) = \text{span}(H_{21}^{-1}H_{23}V_{31})$ |
| $V_{31} = H_{13}^{-1}H_{12}V_{22}$ | $\text{span}(H_{31}^{-1}H_{32}V_{22}) =$ |
| | $\text{span}(H_{21}^{-1}H_{23}H_{13}^{-1}H_{12}V_{22})$ |
| $V_{22} = [e_1 e_2 \ldots e_{M/3}]$ | $\text{span}(V_{22}) = \text{span}(TV_{22})$ |
| | $T = H_{32}^{-1}H_{31}H_{21}^{-1}H_{23}H_{13}^{-1}H_{12}$ |

In Table 2, $H_{ab}$ denotes a channel from base station b to user a, and $V_{ab}$ denotes a beam of antenna dimension b of base station a. Each beam is designed through an inverse function of the channel and, particularly, $V_{22}$ is designed through an eigenvector of T to meet a condition of span $(V_{22})=\text{span}(TV_{22})$. An element $e_i$ of $V_{22}$ denotes an $i^{th}$ eigenvector.

Figure 7:
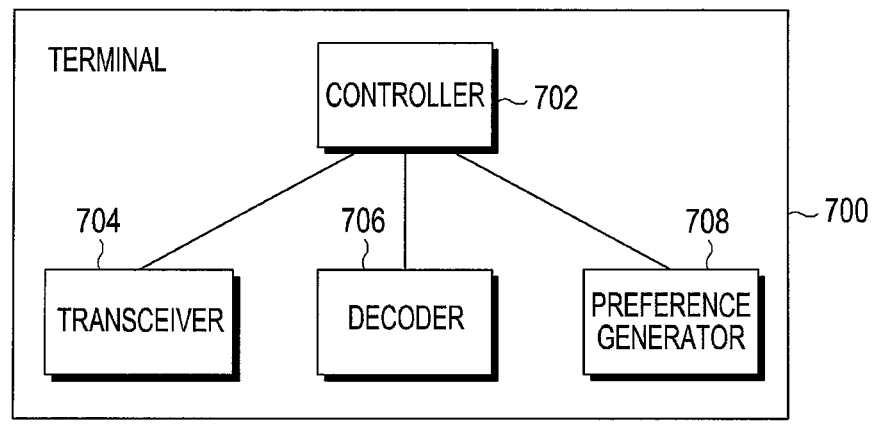
FIG. 7 illustrates an example of a block diagram of a terminal according to an embodiment of the present disclosure.

FIG. 7 illustrates an example of a block diagram of a terminal according to an embodiment of the present disclosure.

Referring to FIG. 7, a terminal 700 according to an embodiment of the present disclosure includes a controller 702, a transceiver 704, a decoder 706, and a preference generator 708. The elements of the terminal 700 are only an example and can be subdivided into sub units or integrated into one unit according to an embodiment or a service provider's intention.

According to an embodiment of the present disclosure, the controller 702 estimates a channel based on pilot signals which the transceiver 704 receives from a serving base station and an adjacent base station. Further, the controller 702 generates information on the estimated channel and controls the transceiver 704 to feed the generated channel information back to each base station. In addition, the controller 702 controls the preference generator 708 to generate preference information of an interference signal for each base station by using the pilot signals. The preference generator 708 measures sizes of interference before beamforming with respect to pilot signals received through the transceiver 704, divides the size of the interference into "weak", "medium", and "strong" based on a position that matches a channel capacity acquired using a TDM scheme and a position where a size of an interference channel becomes equal to a size of its own channel, aligns the strengths of the divided interference signals as illustrated in FIG. 6A, and maps information on a strength of the preferred interference signal according to each antenna dimension to preference information as illustrated in FIG. 6B. Further, the transceiver 704 transmits corresponding preference information to each base station.

Thereafter, when information related to interference polarization reconstruction for the reception area of the terminal 700 determined based on the preference information is received through the transceiver 704, the controller 702 decodes signals received using the information related to interference polarization reconstruction. The information related to interference polarization reconstruction can include the beam information and the transmission power information set to receive the signals received for each of the serving base station and the adjacent base stations through the interference alignment dimension, the dimension in which weak interference is received, and the dimension in which strong interference is received as illustrated in FIG. 6C through steps 516 to 520 of FIG. 5.

Figure 8:
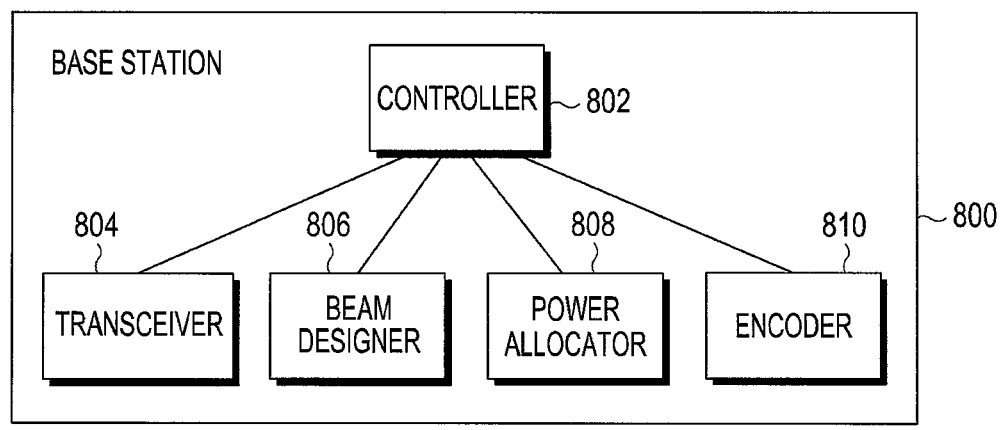
FIG. 8 illustrates an example of a block diagram of a base station according to an embodiment of the present disclosure.

FIG. 8 illustrates an example of a block diagram of a base station according to an embodiment of the present disclosure.

Referring to FIG. 8, a base station 800 according to an embodiment of the present disclosure includes a controller 802, a transceiver 804, a beam designer 806, a power allocator 808, and an encoder 810. Such elements of the base station 800 are only examples, but the elements of the base station 800 can be subdivided into sub units or integrated into one unit according to an embodiment and a user's intention.

The transceiver 804 receives base station-specific channel information and preference information from at least one terminal. Then, the controller 802 controls the beam designer 806 to configure beams of each base station to divide dimensions of signals received by the corresponding terminal into an interference alignment dimension, a dimension for receiving weak interference, and a dimension for receiving strong interference by using the preference information and the channel information and to receive corresponding signals through the divided dimensions. Further, the power allocator 808 controls transmission power of the beam for transmitting the signal through each dimension of the corresponding terminal under an instruction of the controller 802. The controller 802 controls the encoder 810 to encode the signal to which the configured beams and the transmission power and controls the transceiver 804 to transmit the encoded signal to the terminal.

The controller 802 controls the transceiver 804 to transfer information on the beams designed according to an embodiment of the present disclosure, power control information of the corresponding beam, and decoding-related information to the terminal.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for operating a user terminal in a communication system using multiple antennas, the method comprising:
    classifying a ratio between a signal strength for a data signal from a serving base station and a signal strength for an interference signal from an adjacent base station into a first or second rank;
    in case that the ratio is classified into the first rank indicating that the signal strength for the interference signal is greater than the signal strength for the data signal, mapping the ratio to a first instruction to use a transmission power at the adjacent base station less than a predetermined power threshold value;
    in case that the ratio is classified into the second rank indicating that the signal strength for the interference signal is less than the signal strength for the data signal, mapping the ratio to a second instruction to use a transmission power at the adjacent base station greater than the predetermined power threshold value;
    generating preference information including the first or second instruction;
    transmitting, by the user terminal, the generated preference information to the serving base station; and
    receiving, from the serving base station by the user terminal, information related to beams of the serving base station and the adjacent base station, wherein the information is determined based on the first or second instruction.

2. The method of claim 1, further comprising:
    receiving, from the adjacent base station by the user terminal, a first interference signal through a first antenna dimension of the multiple antennas;
    receiving, from the adjacent base station by the user terminal, a second interference signal through a second antenna dimension of the multiple antennas;
    receiving, from the serving base station by the user terminal, a data signal through the second antenna dimension; and
    obtaining, by the user terminal, a message from the data signal based on at least one of the first interference signal or the second interference signal.

3. The method of claim 2, wherein one part of the beams corresponds to the first antenna dimension and another part of the beams corresponds to the second antenna dimension, and wherein transmission powers of the beams are determined based on the first or second instruction.

4. A method of controlling interference of a user terminal by a serving base station in a communication system using multiple antennas, the method comprising:
- receiving, from the user terminal by the serving base station, preference information including a first or second instruction,
- in case the preference information including the first instruction, the first instruction being an instruction to use a transmission power at an adjacent base station less than a predetermined power threshold value,
- in case the preference information including the second instruction, the second instruction being an instruction to use a transmission power at an adjacent base station greater than the predetermined power threshold value,
- wherein the first instruction is mapped to a ratio being classified into a first rank indicating that a signal strength for an interference signal is greater than a signal strength for a data signal, and the second instruction is mapped to a ratio being classified into a second rank indicating that the signal strength for the interference signal is less than the signal strength for the data signal;
- configuring, by the serving base station, beams of the serving base station based on the first or second instruction; and
- transmitting, by the serving base station, information related to the configured beams to the user terminal.

5. The method of claim 4, wherein the beams of the serving base station are configured to divide dimensions of signals received by the user terminal into a first antenna dimension of the multiple antennas and a second antenna dimension of the multiple antennas based on the first or second instruction, wherein one part of the configured beams corresponds to the first antenna dimension and another part of the configured beams corresponds to the second antenna dimension.

6. The method of claim 4, wherein transmission powers of the configured beams are determined based on the first or second instruction.

7. A user terminal in a communication system using multiple antennas, the user terminal comprising:
- a transceiver; and
- a controller configured to:
  - classify a ratio between a signal strength for a data signal from a serving base station and a signal strength for an interference signal from an adjacent base station into a first or second rank,
  - in case that the ratio is classified into the first rank indicating that the signal strength for the interference signal is greater than the signal strength for the data signal, map the ratio to a first instruction to use a transmission power at the adjacent base station less than a predetermined power threshold value,
  - in case that the ratio is classified into the second rank indicating that the signal strength for the interference signal is less than the signal strength for the data signal, map the ratio to a second instruction to use a transmission power at the adjacent base station greater than the predetermined power threshold value,
  - generate preference information including the first or second instruction,
  - control the transceiver to transmit the preference information to the serving base station, and
  - control the transceiver to receive, from the serving base station, information related to beams for the serving base station and the adjacent base station, wherein the information is determined based on the first or second instruction.

8. The user terminal of claim 7, wherein the controller is further configured to:
- control the transceiver to receive, from the adjacent base station, a first interference signal through a first antenna dimension the multiple antennas,
- control the transceiver to receive, from the adjacent base station, a second interference signal through a second antenna dimension of the multiple antennas,
- control the transceiver to receive, from the serving base station, a data signal through the second antenna dimension, and
- obtain a message from the data signal based on at least one of the first interference signal or the second interference signal.

9. The user terminal of claim 8, wherein one part of the beams corresponds to the first antenna dimension and another part of the beams corresponds to the second antenna dimension, and wherein transmission powers of the beams are determined based on the first or second instruction.

10. A serving base station for controlling interference of a user terminal in a communication system using multiple antennas, the serving base station comprises:
- a transceiver; and
- a controller configured to:
  - control the transceiver to receive preference information including a first or second instruction,
  - in case the preference information including the first instruction, the first instruction being an instruction to use a transmission power at an adjacent base station less than a predetermined power threshold value,
  - in case the preference information including the second instruction, the second instruction being an instruction to use a transmission power at the adjacent base station greater than the predetermined power threshold value,
  - wherein the first instruction is mapped to a ratio being classified into a first rank indicating that a signal strength for an interference signal is greater than a signal strength for a data signal, and the second instruction is mapped to a ratio being classified into a second rank indicating that the signal strength for the interference signal is less than the signal strength for the data signal,
  - configure beams of the serving base station based on the first or second instruction; and
  - control the transceiver to transmit information related to the configured beams to the user terminal.

11. The serving base station of claim 10, wherein the beams of the serving base station are configured to divide dimensions of signals received by the user terminal into a first antenna dimension of the multiple antennas and a second antenna dimension of the multiple antennas based on the first or second instruction, wherein one part of the configured beams corresponds to the first antenna dimension and another part of the configured beams corresponds to the second antenna dimension.

12. The serving base station of claim 10, wherein transmission powers of the configured beams are determined based on the first or second instruction.

* * * * *